March 24, 1970  A. K. BEY  3,502,223
MAGNETIC PEN HOLDER
Filed Aug. 15, 1968
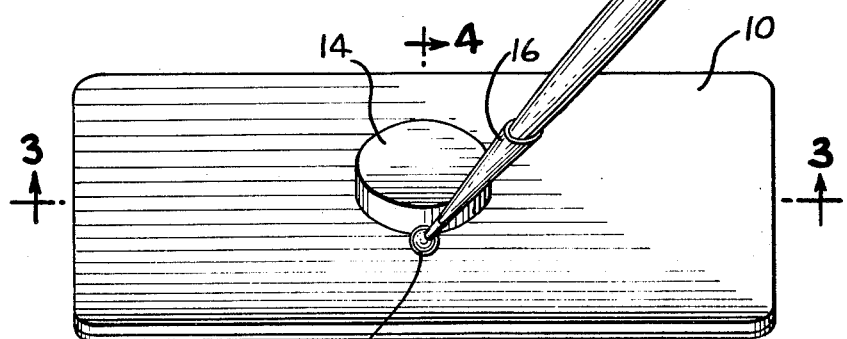
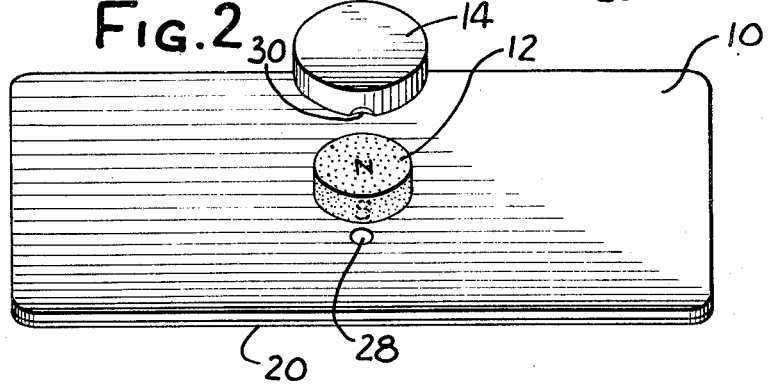
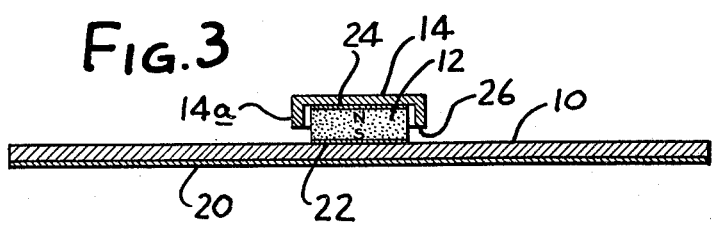
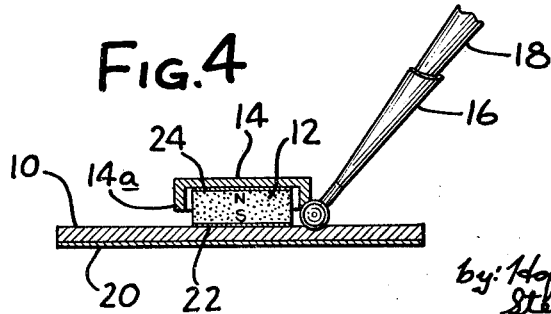
INVENTOR
AHMET K. BEY
ATTYS.

United States Patent Office 3,502,223
Patented Mar. 24, 1970

3,502,223
MAGNETIC PEN HOLDER
Ahmet K. Bey, Chicago, Ill., assignor to Frances Budreck
Filed Aug. 15, 1968, Ser. No. 752,963
Int. Cl. A47f 7/00; B43m 11/08
U.S. Cl. 211—69.6
3 Claims

ABSTRACT OF THE DISCLOSURE

A magnetic pen holder which includes a flat base member of magnetizable material. A flat disc-shaped permanent magnet is mounted on top of the base member and a cup-shaped cap member of magnetizable material is mounted over the magnet with a lower marginal edge spaced from the base member. Complementary, adjacent concave recesses are formed in the top of the base member and the lower marginal edge of the cap member to receive a spherical, magnetizable portion of a pen receiving socket.

BACKGROUND OF THE INVENTION

There is a wide variety of magnetic pen and/or pencil holders presently on the market which have pen receiving sockets with a magnetizable spherical member mounted at the closed end of the socket and with the spherical member positioned in a concave recess. The recess has a magnetic field thereacross for holding the pen receiving socket and permitting the socket to swivel about the spherical member held by the magnetic field in the recess. Heretofore, because of esthetic considerations, various magnetic members which produce the magnetic field in the concave recess have been closely fitted and carefully embedded in a base member so as to form the concave recess for receiving the spherical member on the pen receiving socket. Most of the magnetic members utilized in such pen holders also had to be drilled to receive a metal core, and various magnetizable washers were utilized to produce the magnetic field in the concave recess. These various magnetic members had to be sized and machined to have a proper fit and produce the desired magnetic field. With such pen holders as just described, the overall cost of manufacturing the holder is quite high as compared to the cost of the simple materials from which the holder is made, thus resulting in a relatively expensive item for simply holding a standard desk pen or pencil. The present invention positions the magnetic elements on top of the base member of the pen holder and eliminates the sized and fitted magnetic components.

SUMMARY OF THE INVENTION

This invention relates to a new and improved magnetic pen holder.

An object of the present invention is the provision of a magnetic pen holder which is simple and easy to manufacture and far less expensive than magnetic pen holders heretofore available.

A further object of the invention is to provide a magnetic pen holder which comprises a flat base member fabricated of magnetizable material and designed to set on the top of a desk or the like. A disc-shaped permanent magnet is positioned on top of the flat base member and a magnetizable cup-shaped cap member is positioned over the magnet with the marginal edge thereof spaced from the top of the flat base member. The cap member, magnet and base member are held together by appropriate cement or like material. Complementary, adjacent concave recesses are formed in the top surface of the base member and the lower marginal edge of the cap member for receiving a spherical magnetizable member on a pen receiving socket, whereby the magnetic field from the magnet (which is sandwiched between the cap member and the base member) flows through the spherical member on the pen receiving socket to hold the socket in the concave recesses in the cap member and base member.

Other features, objects and advantages will be apparent from the following detailed description taken in connection with the accompanying drawings.

DESCRIPTION OF THE DRAWINGS

FIGURE 1 is a front perspective view of a magnetic pen holder embodying the invention;

FIG. 2 is an exploded, front perspective view of the cap member, magnet and base member of the present invention;

FIG. 3 is a sectional view taken generally along the line 3—3 of FIG. 1; and

FIG. 4 is a sectional view taken generally along the line 4—4 of FIG. 1.

DETAILED DESCRIPTION OF THE INVENTION

The magnetic pen holder of this invention generally comprises a base member 10, a source of unidirectional magnetic field, such as a permanent magnet 12, a cap member 14, and a pen receiving socket 16 for receiving conventional pens or pencils, such as 18 in FIGS. 1 and 4.

The base member 10 is fabricated of magnetizable material, preferably of a hard metallic material so that it can be highly polished or etched, for esthetic purposes. Of course, the base member may be fabricated of any suitable material whatsoever as long as the portion thereof which lies beneath the magnet 12 and cap 14 is fabricated of magnetizable material. A layer 20 of felt or similar material is glued to the bottom of the base member 10 to prevent scratching or marring the top of a deck, table or other item of furniture on which the pen holder is to be positioned.

The permanent magnet 12 is shown in the drawings as a disc-shaped member having opposite flat faces. The magnet is placed on top of the base member 10 and is held in place by a layer 22 of cement or other suitable adhesive. Of course, if only a portion of the base member 10 is fabricated of magnetizable material, the magnet 12 must be placed on top of that portion.

The cap member 14 is preferably round and cup-shaped to fit over the top of the magnet 12, as shown best in FIGS. 3 and 4, with an annular wall 14a depending over the side of the magnet 12. The cap member 14 is held on top of the magnet by another layer 24 of cement or appropriate adhesive. The lower marginal edge 26 of the cap member 14 must be spaced from the top of the magnetizable base member 10 so that the magnetic field produced by the magnet 12 bridges the gap and provides a magnetic force for holding the pen receiving socket 16, as hereinafter described. Of course, both the magnet 12 and the cap member 14 may be of any desired configuration or shape so long as the lower marginal edge of the magnetizable cap member is spaced from the top surface of the magnetizable base member 10, and the poles of the magnet 12 are arranged so that the magnetic lines of force bridge the gap so formed.

In the embodiment illustrated in the drawings, the base member 10 is formed with a concave recess 28 (FIGS. 2 and 4) and the lower marginal edge of the cap member 14 is also formed with a complementary, adjacent concave recess 30. The recesses 28 and 30 are positioned in the base member 10 and cap member 14, respectively, so that they cooperate to receive a magnetizable spherical portion 32 on the closed end of the pen receiving socket 16. It is contemplated, that a plurality of such recesses could be formed on the base member and cap member about the magnet 14 to receive the pen receiving socket 16 in various positions about the cap member 14. It would also be possible to form a concave channel in the base member 10 about the magnet 12 to receive and position the pen receiving socket 16 (or a plurality of sockets) in an infinite number of positions about the magnet 12.

In operation, with the poles of the permanent magnet 12 arranged vertically in the magnet, the magnetic lines of force are confined to the magnetizable base member 10 and the magnetizable cap member 14 so that the lines of force pass through said members and bridge the gap between the top surface of the base member 10 and the lower marginal edge of the cap member 14, creating a magnetic field therebetween to hold the magnetizable spherical portion 32 of the pen receiving socket 16.

The foregoing detailed description has been given for clearness of understanding only and no unnecessary limitations should be understood therefrom as some modifications will be obvious to those skilled in the art.

I claim:

1. A magnetic pen holder, comprising: a base member at least a portion of which is fabricated of magnetizable material; a source of unidirectional magnetic field disposed on top of said base member overlying said magnetizable portion; a magnetizable cap member disposed on top of said source and spaced from the magnetizable portion of said base member whereby the magnetic field produced by said source is confined to said cap member and said portion of the base member with the magnetic field bridging the space therebetween; and a pen receiving socket having a magnetizable portion positioned at least partly in the space between the cap member and the base member and held in such position by the magnetic field produced by said source.

2. The magnetic pen holder of claim 1 wherein the magnetizable portion of said base member has a flat, top surface and said cap member is cup-shaped and positioned over said source with a lower marginal edge spaced from said surface.

3. The magnetic pen holder of claim 2 wherein said source is a disc-shaped permanent magnet and said cap member is round and with an annular wall depending over the sides of said magnet.

References Cited

UNITED STATES PATENTS

| 2,510,634 | 6/1950 | Hull | 211—69.6 |
| 2,510,648 | 6/1950 | Moholy-Nagy | 211—69.6 |
| 2,561,923 | 7/1951 | Harmon | 211—69.6 |
| 3,120,216 | 2/1964 | Meinhart | 211—69.6 |

JAMES E. LEPPINK, Primary Examiner